(12) United States Patent
Livingston et al.

(10) Patent No.: US 11,989,191 B2
(45) Date of Patent: May 21, 2024

(54) ELECTRONIC CONTENT RANKING BASED ON DISTRIBUTION AND CONSUMPTION

(71) Applicant: QUANTIFY LABS, INC., Toronto (CA)

(72) Inventors: Blair Livingston, Toronto (CA); Matt Ball, Toronto (CA)

(73) Assignee: QUANTIFY LABS, INC., Toronto (CA)

(*) Notice: Subject to any disclaimer, the term of this patent is extended or adjusted under 35 U.S.C. 154(b) by 25 days.

(21) Appl. No.: 17/544,501

(22) Filed: Dec. 7, 2021

(65) Prior Publication Data

US 2022/0092074 A1 Mar. 24, 2022

Related U.S. Application Data

(63) Continuation of application No. 16/413,897, filed on May 16, 2019, now Pat. No. 11,226,973, which is a continuation of application No. 14/815,140, filed on Jul. 31, 2015, now Pat. No. 10,339,145.

(60) Provisional application No. 62/031,934, filed on Aug. 1, 2014.

(51) Int. Cl.
*G06F 16/24* (2019.01)
*G06F 16/2457* (2019.01)
*G06F 16/9535* (2019.01)

(52) U.S. Cl.
CPC .. *G06F 16/24578* (2019.01); *G06F 16/24575* (2019.01); *G06F 16/9535* (2019.01)

(58) Field of Classification Search
CPC ......... G06F 16/24578; G06F 16/24575; G06F 16/9535
See application file for complete search history.

(56) References Cited

U.S. PATENT DOCUMENTS

| | | | |
|---|---|---|---|
| 2008/0201348 A1* | 8/2008 | Edmonds | G06Q 30/02 |
| 2009/0125511 A1* | 5/2009 | Kumar | G06Q 10/107 |
| | | | 707/999.005 |
| 2011/0082881 A1 | 4/2011 | Chunilal | |

(Continued)

OTHER PUBLICATIONS

EPO, Communication pursuant to Article 94(3), dated Jun. 25, 2018, re European Patent Application No. 15179293.4.

(Continued)

*Primary Examiner* — Loc Tran
(74) *Attorney, Agent, or Firm* — Perry + Currier Inc.

(57) ABSTRACT

Distribution of content items provided by content producer computers to content consumer computers via a computer network is controlled and indications of different interactions with content items contained in messages distributed to content consumer computers are tracked. The different interactions with content items occur at the content consumer computers. Content items are indexed and ranked indications of at least some indexed content items are output in response to search queries. Tracking indications of different interactions with indexed content items occurs at the content consumer computers. Indications of different interactions with content items contained in messages distributed to content consumer computers and with indexed content items outputted in response to search queries are quantified. Content items are ranked based on the indications of different interactions.

12 Claims, 13 Drawing Sheets

(56) References Cited

U.S. PATENT DOCUMENTS

| | | | |
|---|---|---|---|
| 2011/0225140 A1* | 9/2011 | Wu | G06F 16/9535 |
| | | | 707/723 |
| 2012/0278725 A1* | 11/2012 | Gordon | H04N 21/858 |
| | | | 715/738 |
| 2012/0291079 A1 | 11/2012 | Gordon et al. | |
| 2015/0213022 A1* | 7/2015 | Agarwal | G06F 16/24575 |
| | | | 707/731 |

OTHER PUBLICATIONS

EPO, Extended European Search Report, dated Dec. 9, 2015 for European Patent Application No. 15179293.4.

USPTO, Notice of Allowance and Fee(s) Due, dated Feb. 14, 2019, re U.S. Appl. No. 14/815,140.

USPTO, Non-Final Rejection, dated Dec. 27, 2017, re U.S. Appl. No. 14/815,140.

EPO, Communication pursuant to Article 94(3), dated Dec. 19, 2019, re European Patent Application No. 15179293.4.

* cited by examiner

ELECTRONIC CONTENT RANKING BASED ON DISTRIBUTION AND CONSUMPTION

CROSS-REFERENCE TO RELATED APPLICATIONS

This application claims priority to U.S. provisional application 62/031,934, filed on Aug. 1, 2014, and which is incorporated herein by reference.

FIELD

The present invention relates to a system and method for ranking content. More specifically, the present invention relates to a system and method for ranking content based on tracked access and/or usage of such information.

BACKGROUND

In order for content to be useful to users it first needs to be discovered. Search engines are known to determine relevance and provide content based on relevance. However, search engines are typically designed to analyze arbitrary content, and their algorithms are generally robust so as to adequately deal with the unknown or, worse, malicious or search-engine optimized content. Determination of relevance often suffers as a result, particularly within a narrowly defined field of content, such as financial information.

In addition, search engines fail to adequately identify or quantify user interactions with content. This may be a result of the need for robustness. Interactions with public content by the general public can be quite different from interactions by professionals with content related to their field.

Furthermore, search engine-determined relevance fails to adequately take into account other modes of content delivery. Parallel channels of distribution are often overlooked or poorly quantized.

SUMMARY

According to one aspect of the present invention, a content distribution system includes a content subscription manager configured to control distribution of content items provided by content producer computers to content consumer computers via a computer network, and a message tracking engine configured to track indications of different interactions with content items contained in messages distributed by the content subscription manager. The different interactions with content items occur at the content consumer computers. The system further includes a search engine configured to index content items and output ranked indications of at least some indexed content items in response to search queries. The search engine includes a presentation engine configured to track indications of different interactions with indexed content items occurring at the content consumer computers. The system further includes a content ranking engine configured to receive indications of different interactions from the message tracking engine and the search engine. The content ranking engine is configured to rank the content items based on the received indications of different interactions with content items occurring at the content consumer computers.

The content ranking engine can include rank adjustment processing logic configured to calculate ranks for the content items based on weightings or adjustment values for the different interactions with the content items.

The rank adjustment processing logic can be further configured to calculate ranks for content producers at content producer computers based on ranks of associated distributions controlled by the content subscription manager, and to calculate ranks for distributions controlled by the content subscription manager based on ranks of content items contained in the distributions.

The rank adjustment processing logic can be further configured to calculate ranks for content consumers at the content consumer computers based on ranks of content producers at the content producer computers, the content consumers and content producers being associated via the distributions.

The rank adjustment processing logic can be further configured to calculate ranks for distributions controlled by the content subscription manager based on ranks of content items contained in the distributions and damping factors based on ages of content items.

The content ranking engine can be further configured to assign ranks to the content items further based on consumer user identity factors of content consumers at the content consumer computers, the consumer user identity factors increasing or decreasing effects of different interactions to account for consumer user influence.

The content ranking engine can be further configured to assign a plurality of ranks to content items for a plurality of different keywords and a plurality of different categories.

According to another aspect of the present invention, a method of content distribution with ranking includes controlling distribution of content items provided by content producer computers to content consumer computers via a computer network, and tracking indications of different interactions with content items contained in messages distributed to content consumer computers. The different interactions with content items occur at the content consumer computers. The method further includes indexing content items and outputting ranked indications of at least some indexed content items in response to search queries, and tracking indications of different interactions with indexed content items occurring at the content consumer computers. The method further includes receiving indications of different interactions with content items contained in messages distributed to content consumer computers and with indexed content items outputted in response to search queries, and ranking the content items based on the received indications of different interactions.

The method can further include calculating ranks for the content items based on weightings or adjustment values for the different interactions with the content items.

The method can further include calculating ranks for content producers at content producer computers based on ranks of associated distributions controlled by a content subscription manager, and calculating ranks for distributions controlled by the content subscription manager based on ranks of content items contained in the distributions.

The method can further include calculating ranks for content consumers at the content consumer computers based on ranks of content producers at the content producer computers, the content consumers and content producers being associated via the distributions.

The method can further include calculating ranks for distributions controlled by the content subscription manager based on ranks of content items contained in the distributions and damping factors based on ages of content items.

The method can further include assigning ranks to the content items further based on consumer user identity factors of content consumers at the content consumer computers, the consumer user identity factors increasing or decreasing effects of different interactions to account for consumer user influence.

The method can further include assigning a plurality of ranks to content items for a plurality of different keywords and a plurality of different categories.

BRIEF DESCRIPTION OF THE DRAWINGS

Preferred embodiments of the present invention will now be described, by way of example only, with reference to the attached Figures.

DETAILED DESCRIPTION

In one aspect, the present invention ranks content for search and recommendation purposes based on interactions with the content via a different channel, such as direct distribution via email or other messaging system. That is, interactions from targeted users, such as those that receive message-based distribution of the content, are used to rank the content for output at a search engine and other tools. Deep interactions are not readily obtainable or quantifiable via a search engine interface, and rankings have suffered in conventional schemes. The present invention addresses this problem by measuring interactions via the messaging system and transforming those measured interactions into rankings that can be used by the search engine or when otherwise recommending content. Such rankings can also be used by other tools or services.

One technical problem solved by the present invention is the lack of interaction data available to search engine interfaces, which are commonly web-based interfaces that display a list of results with short text strings pulled from the content of the results. A typical user does not read the content of all search results nor attempt to read all of such, but it would be beneficial to account for a desire to read or a time of actual reading when ranking search results. Hence, the present inventions uses another different and independent pathway, that is, message-based content delivery to track indications of a desire to read or a time of actual reading, as well as other interactions with content, to inform search engine rankings. This technical problem does not typically occur outside of networked computer systems, as interaction quantification performed by simple human observation or other means offers much richer information than what is available via search engine interfaces or other computer interfaces.

Advantages of this aspect of the present invention include improved content rankings that provide desired content to users quickly and efficiently, thereby reducing demands on communications resources by avoiding sending content that is less desired. Further advantages include better use of data resources, in that low ranked content can be removed from a system and high ranked content can be moved to storage that has better uptime and faster access times.

Other aspects of the present invention, technical problems solved, and advantages will be apparent in light of the following disclosure.

Figure 1:
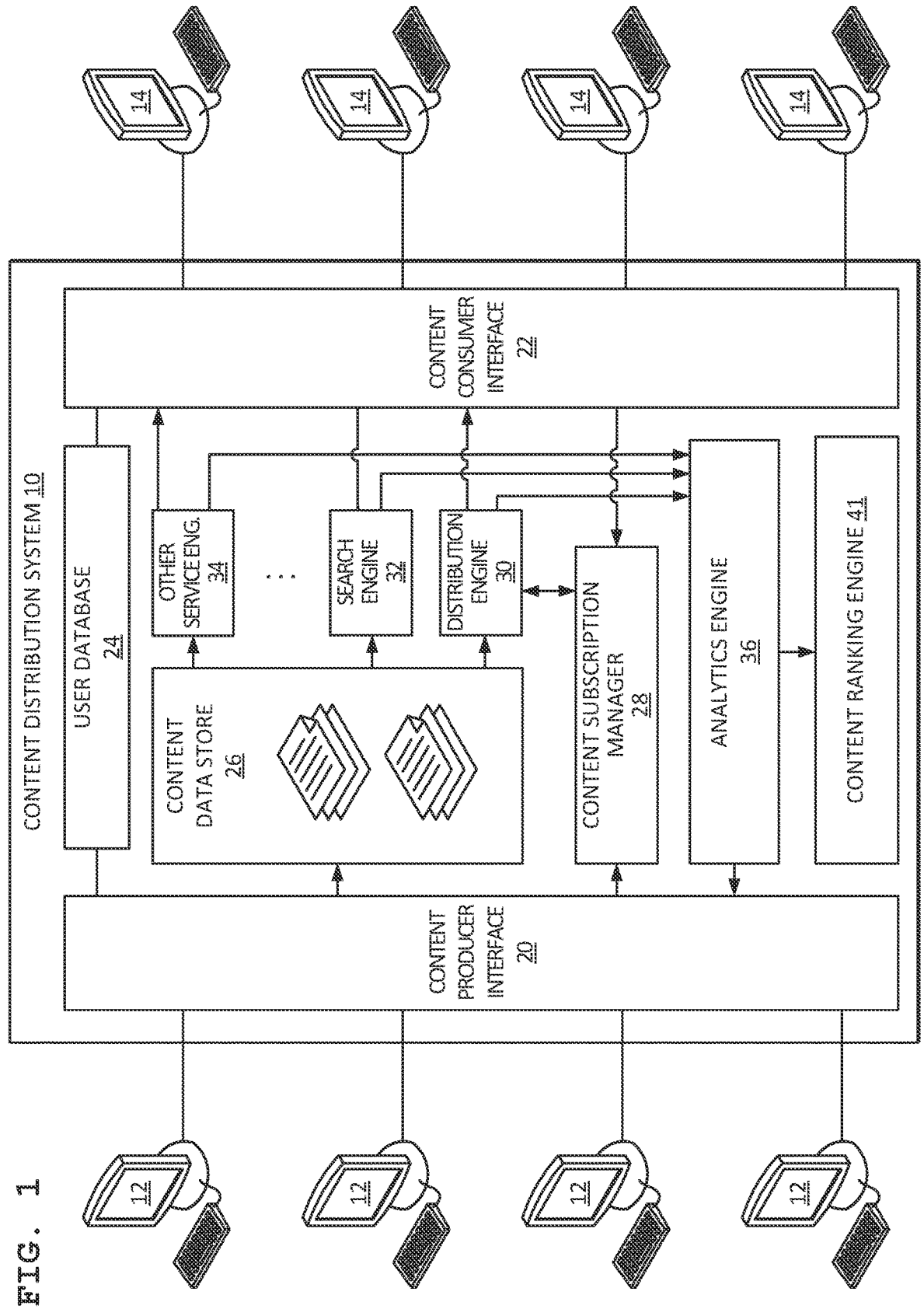
FIG. 1 is a block diagram of a content distribution system.

FIG. 1 shows a content distribution system 10 for ranking content and presenting ranked content according to an embodiment of the present invention. Individual items of content are ranked based on consumer user interactions with the content. Content rank can be related to consumer user characteristics, keyword, category, or a combination of such. Various ranks of individual items of content can be combined to obtain a rank for a distribution (e.g., a mailing list) to which the individual items of content belong. Distribution ranks can be combined to arrive at an overall rank for a content producing user who authors the distributions. Any level of rank, or combination of such, can then be used to sort content, recommend content to consumer users, charge for inline advertisements or preferred content placement, and similar.

The content distribution system 10 includes one or more computers, which can be referred to as servers. The components of the content distribution system 10 that will be described herein can each be implemented on one or more of the computers.

A plurality of content producer computers 12 can connect to the content distribution system 10 via a computer network to interact with the content distribution system 10. The content producer computers 12 are operated by content producer parties. The network can include the Internet, one or more intranets, virtual private networks (VPNs), and similar.

An example of a content producer party is a brokerage that buys and sells stocks and other financial instruments. The brokerage operates as a content producer party and various content producer users (e.g., brokers and their staff) operate content producer computers 12. Another example of a content producer party is an individual content producer user, such as a person working in academia or a freelance operator, who operates his/her own content producer computer 12.

A plurality of content consumer computers 14 can connect to the content distribution system 10 via the network to interact with the content distribution system 10. The content consumer computers 14 are operated by the content consumer parties. An example of a content consumer party is an investment fund that invests in stocks and other financial instruments. The investment fund operates as a content consumer party 11 and various content consumer users (e.g., fund managers and their staff) operate content consumer computers 14.

Generally, the term "content producer" refers to users, parties, firms, organizations, and components involved in generating and publishing content about various financial instruments, products, markets, segments, and similar. Content producers can also be sellers of financial services, such as trade brokering services, and may be referred to as "sell side" users in this capacity. However, content producers need not be sellers of financial services. In this embodiment the term "content consumer" refers to users, parties, firms, organizations, and components involved in buying financial services. Content consumer users can be investors or representatives thereof, fund managers, and the like, which are often referred to as "buy side" users.

Concerning the overall operation of the system 10 content producer parties generate content and provide such content to the content distribution system 10 via the content producer computers 12. The content distribution system 10 receives and manipulates the content to generate and send modified content to the content consumer computers 14. Modified content is configured to allow tracking of interactions (e.g., who viewed it, duration of viewing, hyperlink clicks, etc.) that are returned from the content consumer computers 14 to the content distribution system 10. The content distribution system 10 collects and processes interactions into interaction data for consumption at the content producer computers 12. Further, the content distribution system 10 processes the interactions to determine ranks for content, so that content may be automatically intelligently positioned in front of content consumer parties. In the meantime, buying and selling occurs between various content producer parties and content consumer parties.

The components of the content distribution system 10 will now be described with reference to FIG. 1. FIG. 1 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The content distribution system 10 includes a content producer interface 20 configured to receive commands and data from the content producer computers 12 and output data and other information to the content producer computers 12. The content producer interface 20 can include a web server configured to serve webpages, which can include a login page for secure login by users of the content producer computers 12. Webpages served by the content producer interface 20 can be script-generated using various techniques and combinations thereof, such as server-side scripting (e.g., Ruby on Rails, ASP, PHP, among many others) and client-side scripting (e.g., JavaScript, jQuery, Ajax, among others).

The content distribution system 10 also includes a content consumer interface 22 configured to receive commands and data from the content consumer computers 14 and output data and other information to the content consumer computers 14. The content consumer interface 22 can include a web server, which can be the same web server used at the content producer interface 20 or can be a different web server configured to serve webpages. Other features and aspects of the content consumer interface 22 can be the same as or similar to the content producer interface 20.

The content producer and content consumer computers 12, 14 can each include a user agents, such as a web browser (e.g., Firefox, Internet Explorer, Google Chrome, etc.) configured to communicate with the respective interface 20, 22 and email clients (e.g., Microsoft Outlook, Gmail clients, etc.) configured to send and receive email with email servers (e.g., Microsoft Exchange, Gmail, etc.). Email servers are contemplated to form part of the network of each content producer and content consumer computer 12, 14.

Interactions between the computers 12, 14 and the interfaces 20, 22 can occur via the Web, email, a combination of such, as well as with similar technologies.

The interfaces 20, 22 and computers 12, 14 can additionally or alternatively be configured to use other communication techniques. For example, the interfaces 20, 22 communicate data according to known or new protocols and the computers 12, 14 can be provided with applications that consume such data and provide commands to the interfaces 20, 22.

The content producer computers 12 provide content to the content distribution system 10 and the content consumer computers 14 consume the content. In this embodiment, the content is related to the financial industry and can include content such as newsletters, alerts, special bulletins, articles, research papers, morning notes, etc. It is contemplated that content producer users create or otherwise obtain the content and upload it to the content distribution system 10. In a financial information embodiment, examples of content producer users include employees of equity trading firms, financial advisors, and the like. Buy-side users can use the content consumer computers 14 to obtain the content provided by the various sell-side users at the content producer computers 12. The content itself can be of interest to content consumer users and, further, can assist content producer users in selling financial services to content consumer users.

The content distribution system 10 further includes a user database 24 configured to store relevant content producer and content consumer user information, such as username, password, contact information (e.g., email address, telephone number, fax number, etc.), firm, mailing address, and real name. The user database 24 can store relevant information such as firm information, and associations between users and firms. For instance, several users can belong to the same firm and the user database 24 can indicate such. The user database 24 can further store roles of various users, such as trader, manager, administrator, director, president, etc. Roles can be associated with permissions within the content distribution system 10. The user database 24 can explicitly identify whether users and firms are content producer or content consumer. Lastly, each user and firm can be provided with unique identification information (an ID) that uniquely identifies the user or firm within the system 10. Components of the system 10 can use the ID as an index to lookup information about users and firms, such as email address, to facilitate content distribution.

The user database 24 can also store non-password authentication credentials, such as identity certificates. In order to access the content distribution system 10, users at the computers 12, 14 must first login and have their credentials verified. It is contemplated that access to the content distribution system 10 is restricted to users whose real-life identities have been confirmed. Accordingly, the user database 24 can include an administrator-editable field indicating whether a user's real-life identity has been confirmed or whether such confirmation is pending.

The content distribution system 10 further includes a content data store 26. The content data store 26 is configured to store the items of content discussed above. The content data store 26 can include one or more databases and can include local and/or distributed (e.g., "cloud") storage. The content data store 26 can be configured to index the stored content by any number of suitable criteria including: date written, date published, title, description, author, author's firm, industry sector, type of financial product (e.g., equity, derivative, etc.), tag(s) or keyword(s), word length, and other relevant metadata. Content can include text and images and can be in the form of stored email messages, hypertext markup language (HTML) documents or fragments, PDF files, text files, or similar. Content can include hyperlinks to other content stored in the data store 26 or elsewhere on the Internet. Content can be stored in association with relevance values, which can be associated with one or more of sector and product.

The content distribution system 10 further includes a content subscription manager 28. The content subscription manager 28 controls how and whether content from the content data store 26 is available to the content consumer computers 14. The content subscription manager 28 is configured to handle content consumer requests to obtain, subscribe to, and unsubscribe from various content. For example, a content consumer user can wish to request delivery of a particular content producer newsletter email. Content producer users can also use the content subscription manager 28 to control distribution of their content. That is, the content subscription manager 28 is configured to handle content producer requests to publish, distribute, and cease distributing content. As will be discussed in detail below, the content subscription manager 28 also provides various rules as to whether and how content from various content producer users can be provided to various content consumer users.

The content distribution system 10 further includes a content distribution engine 30. The distribution engine 30 is configured to distribute content in conformance with settings and rules established at the content subscription manager 28. The distribution engine 30 effects actual delivery of the content provided by the content producer computers 12 to the content consumer computers 14. The distribution engine 30 can be configured to generate and send email or other types of messages containing content stored at the data store 26. The term "engine" is used herein to denote one or more methods or processes configured to arrive at a general goal, and is not to be taken as limiting to particular technology or implementation.

The content distribution system 10 can further include a search engine 32. The search engine 32 can be configured to receive queries from content consumer computers 14 and return relevant items of content stored in the data store 26. The search engine 32 can reference any indexing of the content (e.g., author, tag, etc.), as discussed above, as well as relevance of the content. The search engine 32 can be configured to deliver a selected relevant item of content to the searching content consumer computer 14 in the form of, for example, a webpage containing the item content.

The content distribution system 10 can further include one or more other service engines 34 configured to allow content consumer users to discover and obtain content from the content data store 26.

The content distribution system 10 further includes an analytics engine 36. The analytics engine 36 is configured to receive content engagement information from the content distribution engine 30, search engine 32, and any other service engines 34. Content engagement information can include indications of whether content was viewed, who viewed the content, a duration of time that content was viewed, whether hyperlinks in the content were clicked, and similar. The analytics engine 36 outputs various views of analytics to the content producer interface 20 and outputs analytics data.

The content distribution system 10 further includes a content ranking engine 41 connected to the analytics engine 36 to receive indications of content interaction from the analytics engine 36. The content ranking engine 41 can be configured to provide output of content rank to the distribution engine 30, the search engine 32, and other service engines 34. When the analytics engine 36 reports that a particular item of content has received undergone an interaction by a consumer user, the content ranking engine 41 can translate that interaction into an improved rank for the item of content. This will be discussed in further detail below.

Figure 2:
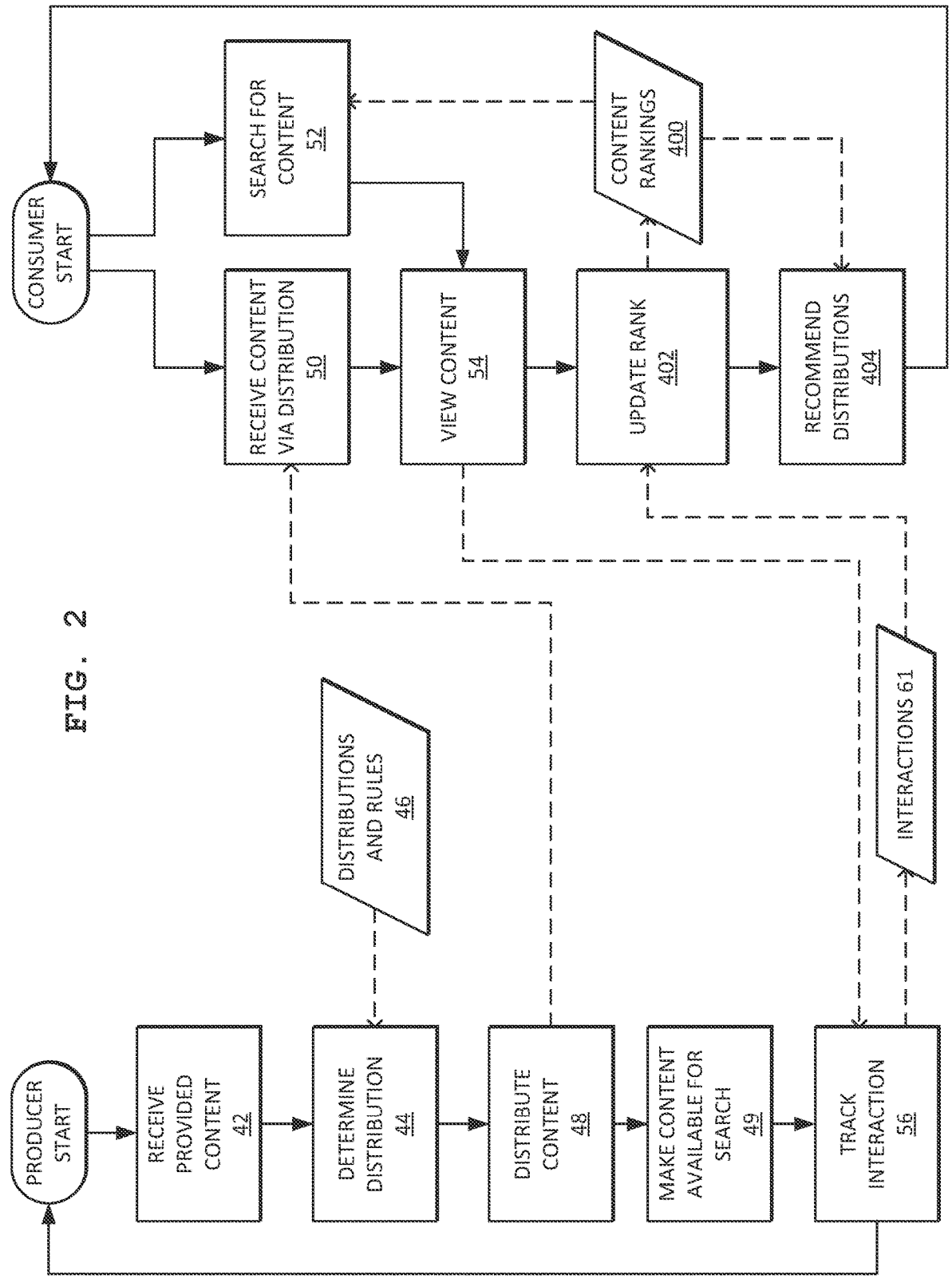
FIG. 2 is a flowchart of methods of distributing content and providing content based on ranking.

FIG. 2 illustrates methods according to the present invention. The methods are shown with illustrative blocks or steps connected by solid lines. Data communication between methods is generally shown in dashed line. The methods of FIG. 2 will be described with reference to FIG. 1, but this is not intended to be limiting and the methods can be used with other systems. The blocks/steps can be performed in sequences other than shown.

At 42, content is provided by content producer users. The content distribution system 10 receives content from various content producer users via content producer computers 12 and the content producer interface 20. Content is stored at the data store 26 until a scheduled time for delivery or until content is requested by content consumer users by, for example, a search.

At 44, distribution for various items of content is determined by the content subscription manager 28. Distributions and rules governing distribution 46 can be referenced. Distributions can be editable by content producer and content consumer users, so that content producer users can add content consumer users to distributions, content consumer users can add themselves to public content distributions, content producer users can remove content consumer users from distributions, and content consumer users can remove themselves from distributions. Rules can be inherent to a list of subscribers for a distribution, having been checked before each subscriber was added, or can be checked or effected on a list of subscribers, at 44. As will be discussed in detail below, rules can be used to ensure compliance with spam and/or securities laws.

Then, at 48, the content distribution engine 30 delivers the content to content consumer computers 14 in accordance with the distributions and any rules 46 maintained by the content subscription manager 28. Content can be distributed directly to the content consumer computers 14 or can first be delivered to a server within the domain of the content consumer computers 14 for subsequent delivery to the content consumer computers 14.

At 49, the content can be made available to the search engine 32, so that content consumer users, including those not subscribed to the relevant distribution, can search for and find the content. Making the content available to the search engine 32 can be delayed a predetermined amount of time (e.g., one week) after the content is distributed to the subscribers. This allows the distribution to have higher value than a general search, while at the same time allowing the content to be discovered by consumer users not on the distribution list. That said, making the content available to the search engine 32 is optional and not all content need be made so.

Content consumer users receive the content at 50. Content consumer users can also use the search engine 32 or other service engine 34 to discover and obtain content, at 52.

The content, whether received via email via a distribution or obtained via search or other method is then presented to the content consumer user, at 54. Content consumer user interaction with the content is tracked, at 56. Tracked interactions 61 can include detecting content opening/viewing, measuring a length of time content is viewed, the monitoring of clicking of hyperlinks within the content, and detecting forwarding of email-conveyed content, and among others. The identity of the consumer user who interacted with the content is known due to the log-in requirement of the content distribution system 10. Content interaction data is then fed into the analytics engine 36, so that such interactions can be studied by content producer users.

Tracked content interactions 61 are also used to update content rankings 400, at 402. Tracked interactions performed by content consumer users, such as those discussed above, are quantified. For instance, opening an email message containing a particular content item can affect rank less than viewing the content item for a specified duration of time, whereas forwarding the message to another user can affect rank more.

Content rankings 400 can be on any scale and can have any sense (i.e., directionality). For example, a scale of 1 to 10 can be used, with 1 being the highest rank and 10 being the lowest. In another example, a scale from 0 to 100 can be used, with 0 being the lowest and 100 being the highest rank. This latter type of rank may be referred to as relevance.

Content rankings 400 are referenced by the search 52, so the higher ranked content, for a given searcher, keyword, or category, is presented more prominently than lower ranked content. Content rankings 400 can also be used, at 404, to determine recommended distributions for a particular content consumer user. Recommended distributions may be offered to the consumer user for subscription, provided that such is permitted by the authoring or managing content producing user.

The content producer method 42-48 and 56 and the content consumer method 50-54 and 402-404 are asynchronous with respect to each other. That is, actions in a given method are not conditional on actions in another of the methods. To illustrate, content producer users can provide and distribute content 42-48 without any content consumer users viewing such content. Content consumer users can view previously provided content 50-54 without any new content being provided by the content producer, and content rankings 400 can be updated based on tracked historic interactions. However, it is worth noting that, despite the asynchronous nature of the methods, each method provides information that is important to at least one other method. For example, the content producer method 42-48 and 56 provides content to the content consumer method 50-54 and 402-404, which in turn provides content interaction data to the content producer users.

Content consumer users benefit from the nature of content, as they currently do. Further, content consumer users benefit from a single system 10 that provides a unified content consumer interface 22 through which content consumer users can manage their subscriptions to content and discover new and relevant content. For example, a content consumer user can readily use the system 10 to find and subscribe to a newly available and highly ranked newsletter in the content consumer user's sector.

Content producer users benefit from a central system in which to publish and distribute content, as well as obtain analytics of content consumer user engagement with the content. Content rank can be revealed to content producer users to help content producer users improve the nature of their content and its delivery. Informative and highly engaging content is thus rewarded.

Figure 3:
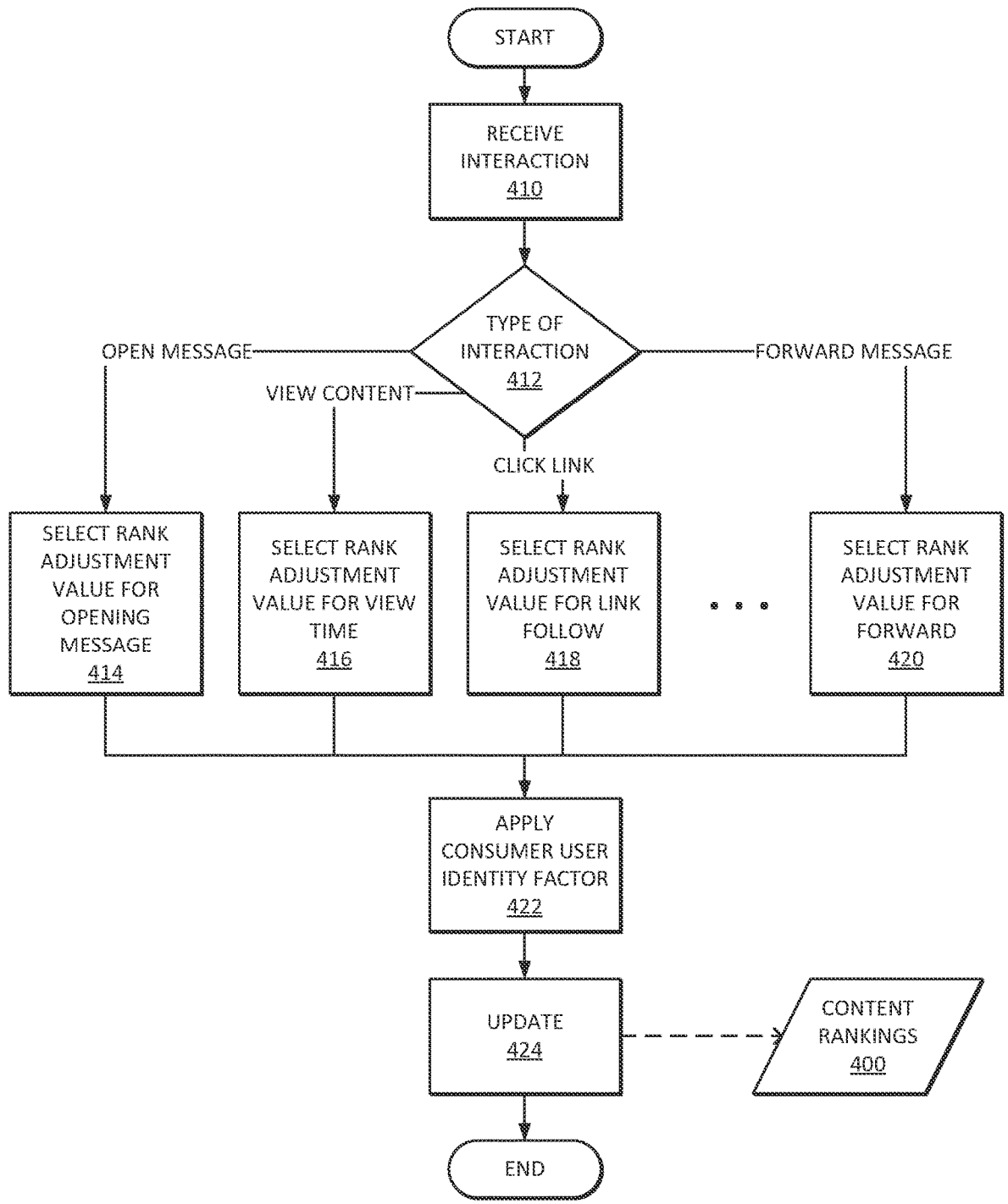
FIG. 3 is a flowchart of a method of updating content ranking.

FIG. 3 shows a method of updating content ranking, such as that performed in step 402 of FIG. 2. The method is shown with illustrative blocks or steps connected by solid lines. Data communication is generally shown in dashed line. The method will be described with reference to FIG. 1, but this is not intended to be limiting and the methods can be used with other systems. The blocks/steps can be performed in sequences other than shown.

The method is triggered by an interaction with an item of content, at 410, and the type of interaction is determined, at 412. Determining the type of interaction may be inherent to receiving the interaction. For example, receiving at a server a request to download a tracking image, receiving a request for another resource, or similar can each constitute detecting a specific type of interaction. However, in other examples, determining the type of interaction may include further actions, such as counting a number of pixels of a tracking image being downloaded to determine content viewing time.

Each type of interaction is associated with a rank adjustment value, which may be stored in a file accessible to the content ranking engine 41. When the type of interaction is determined to be opening a message, a rank adjustment value for opening the message is selected at 414. When the type of interaction is determined to be viewing the message for a threshold time, a rank adjustment value for reading the message is selected at 416. When the type of interaction is determined to be following a link in the message, a rank adjustment value for link following is selected at 418. When the type of interaction is determined to be forwarding the message to another user, a rank adjustment value for forwarding message is selected at 414. Other types of interactions are also contemplated. Interactions that negatively affect rank are also contemplated. For example, deleting the message without reading the content may reduce the rank of the content. Further, although a finite set of static rank adjustment values are described, dynamically calculated rank adjustment values are also contemplated. In such case, the content ranking engine 41 stores one or more formulas for performing the calculation. Parameters for such calculations may include a time between the message being sent and it being opened, a duration of viewing the message, the specific link followed when several links are present, an identity of an intended recipient of a forwarded message, and similar. Such parameters may also be used in a larger set of static rank adjustment values, which may be stored in a lookup table or similar data structure.

Once the rank adjustment value has been determined, a consumer user identity factor can be applied, at 422. Each consumer user may be associated with a factor that increases or decreases the effect of their interaction with the content on its rank. For example, a well-known fund manager may be assigned a higher consumer user identity factor than a junior trader. Hence, a consumer user who is more influential can affect content rank more than other users. It is contemplated that consumer user identity factors can be manually assigned, automatically assigned based on public information, such as trade amounts, or automatically assigned and manually editable.

Lastly, at 424, the content ranking 400 of the specific item of content associated with the interaction is updated. Mathematically, the rank adjustment value may be represented by a number that is multiplied by the consumer user identity factor, the product of which is then subtracted from the rank. For example, when ranks are selected of a scale from 1 (highest) to 10 (lowest), a rank adjustment value of 0.02 multiplied by a consumer user identity factor of 3 may be subtracted from an item of content's existing rank of 6.50 to arrive at an updated and improved rank of 6.44.

Figure 4:
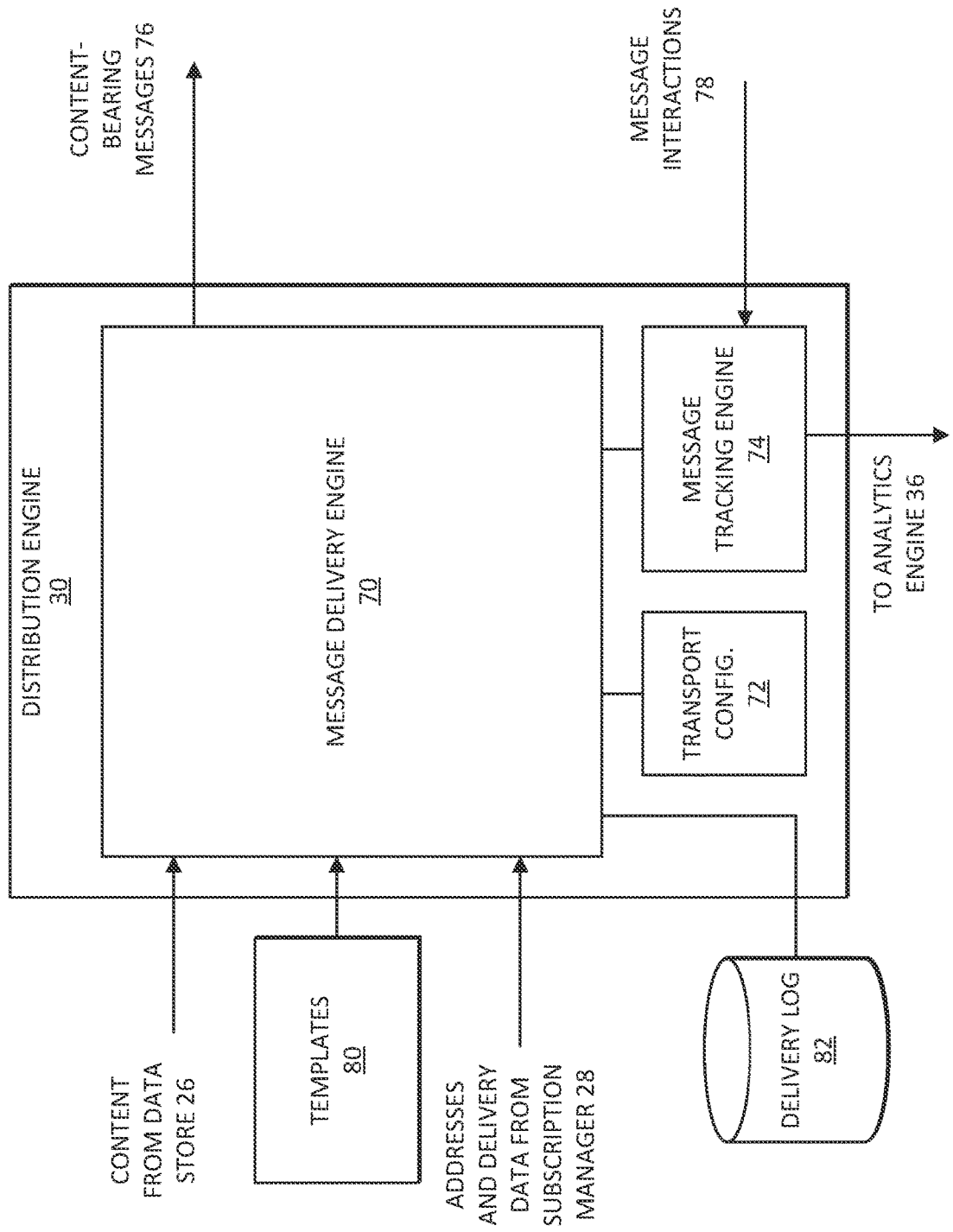
FIG. 4 is a block diagram of a distribution engine.

With reference to FIG. 4, the content distribution engine 30 includes a message delivery engine 70, a transport configuration 72, and a message tracking engine 74. FIG. 4 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The message delivery engine 70 is provided with content from the data store 26 and is configured to insert the content into content-bearing messages 76 destined for content consumer users. In this embodiment, the message delivery engine 70 includes a simple mail transfer protocol (SMTP) mailer program or the like. Content-bearing messages 76 can be HTML-encoded email messages into which content is inserted within an HTML element, such as a DIV element. The message delivery engine 70 can be configured to handle scheduling, bounces/retries, undeliverable notifications, and other sundry aspects of email message delivery.

The message delivery engine 70 can also be configured to pre-process hyperlinks contained within content, so that hyperlinks targeting content outside the content distribution system 10 are rewritten to targets within the system 10 for tracking purposes. In an example of such a technique, a hyperlink originally in the content can be provided as a uniform resource locator (URL) parameter of a rewritten hyperlink. That is, a hyperlink to "www.example.com/article.htm" within the content can be rewritten as "www.contentdistributionsystem.com/redirector?target=www.example.com/article.htm&tracking_code=91008457", so that a redirector within the system 10 can monitor link tracking codes, and thus monitor clicks of hyperlinks within the content, before redirecting the user agent to the original URL ("www.example.com/article.htm"). Other techniques for tracking hyperlink selections can be used, as will be apparent to those of skill in the art.

The message delivery engine 70 is also provided with addresses from the subscription manager 28. Addresses include one or more destination addresses for a particular content-bearing message 76, and can also include copy addresses, blind copy addresses, and reply-to addresses. In the example of email, a list of destination email addresses, which belong to content consumer users who have subscribed to particular content, can be provided to the message delivery engine 70 by the subscription manager 28. The subscription manager 28 can also provide a reply-to email address, so that the receiving content consumer users can respond directly to the content producer user originating the message rather than replying to the message delivery engine 70. The subscription manager 28 can further provide other delivery data such as whether or how a particular message 76 is to be tracked and whether or how delivery of a particular message is to be logged.

The transport configuration 72 is a file or other data structure that stores configuration data, such as the protocol (e.g., SMTP) and settings with which to send the content-bearing messages 76. The transport configuration 72 can also be configured to insert tracking information into messages 76, such as tracking images and hyperlink tracking codes.

The message tracking engine 74 monitors content consumer user interactions 78 with the content-bearing messages 76 after the messages 76 are delivered. Various interactions can be monitored. The message tracking engine 74 can be configured to track the loading of a tracking image inserted into a message 76 to determine whether the message 76 has been opened or viewed, as well as which Internet protocol (IP) address requested the image. The tracking engine 74 can be configured to query an image server to obtain this information about the image. The image server can be configured to throttle a rate of delivery of the tracking image (e.g., 1 bit per second), so that the message tracking engine 74 can determine message viewing duration by querying the image server to obtain the image delivery status (i.e., number of bits delivered). The more bits of the tracking image delivered, the longer the message has been viewed. Different tracking images can be used to track message opening and message viewing duration. The message tracking engine 74 can also be configured to monitor clicking of hyperlinks within messages 76, which can be achieved by the rewriting and redirecting technique discussed above. Output of the message tracking engine 74 is made available to the analytics engine 36 as content interaction data and such data can be date- or time-stamped by the message tracking engine 74.

It is also contemplated that message interactions 78 can include explicit feedback from content consumers. Specifically, messages 76 can include interactive buttons (activating a suitable hypertext tracking link when clicked by a user) or similar features, which the user is asked to click or otherwise interact with if they found the content of the respective message 76 to be useful or of interest. Further, message interaction 78 can comprise a reply email, etc.

Output of the message tracking engine 74 can also be used to update relevance values of the content.

The message delivery engine 70 can also be configured to reference templates 80 when generating content-bearing messages. Templates 80 can be provide in HTML and can contain general information about a content producer firm (e.g., name, logo, letterhead, address, etc.), or specific information of the content producer user (e.g., name, branch office, sector, etc.), sending a particular content-bearing message 76. Templates 80 can be shared among multiple content producer users belonging to a content producer firm. Accordingly, templates 80 can provide a consistent appearance to content-bearing messages 76 despite such messages being sent by different content producer users and containing different content.

The message delivery engine 70 can also be configured to write to a delivery log 82 to maintain a history of messages sent for compliance with relevant laws, such as anti-spam laws and securities trading laws. An example log entry includes delivery timestamp, sender email address, name or email address or other identifier of the distribution, recipient email address, and message subject.

Figure 5:
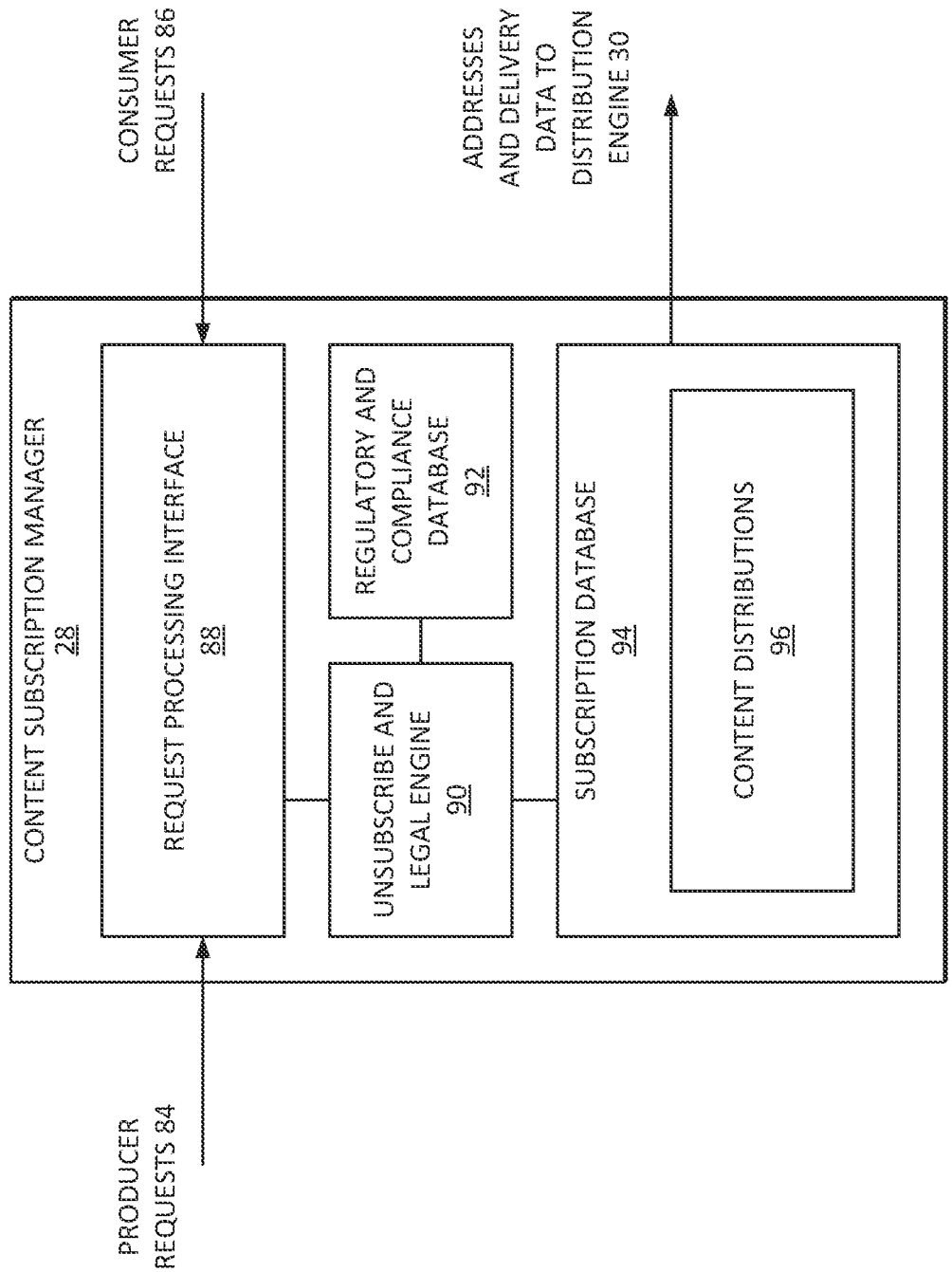
FIG. 5 is a block diagram of a content subscription manager.

FIG. 5 shows the content subscription manager 28. FIG. 5 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The subscription manager 28 is configured to process content producer requests 84 and content consumer requests 86 to add, remove, or modify content subscriptions for various users and distributions. For instance, a content producer request 84 can request that a particular content consumer user be added to a particular content distribution. A content consumer request 86 can similarly request that the requesting content consumer user be added to a content distribution. Requests 84, 86 can also be configured to remove content consumer users from content distribution or change how content consumer users are to receive content (e.g., change frequency of delivery, time of delivery, mailbox to receive deliveries, etc.).

The content subscription manager 28 includes a request processing interface 88. The request processing interface 88 handles incoming requests 84, 86 by passing requests to an unsubscribe and legal engine 90 and providing responses to requesting users. The request processing interface 88 can include one or more webpage forms available via the content producer and content consumer interfaces 20, 22 (FIG. 2).

Incoming requests are processed by the unsubscribe and legal engine 90 with reference to a regulatory and compliance database 92. The unsubscribe and legal engine 90 is configured to process content consumer requests 86 to unsubscribe from particular content. Such unsubscribe requests can arrive via an unsubscribe button at the request processing interface or via a hyperlink within a content-bearing message.

The unsubscribe and legal engine 90 is further configured to deny requests 84, 86 that violate rules established in the regulatory and compliance database 92. For example, a content producer user can require explicit permission from a content consumer user to add the content consumer user to a content distribution. The regulatory and compliance database 92 can further include rules for logging delivery of content-bearing messages sent to particular users. The regulatory and compliance database 92 can further include rules for tracking message interactions, so that the message delivery engine 70 can include or exclude tracking codes/images accordingly. The regulatory and compliance database 92 can further include rules governing insider trading or other securities trading concerns, so as to deny requests 84, 86 that can violate securities laws. Generally, the unsubscribe and legal engine 90 and using a regulatory and compliance database 92 are configured to ensure that content distribution meets legal requirements.

Content consumer and content producer users can have their legal jurisdiction (e.g., country of residence) stored in the user database 24 (FIG. 2), and the unsubscribe and legal engine 90 can be configured to reference the jurisdiction of a user when interacting with the regulatory and compliance database 92 and determining whether a request 84, 86 will be denied or allowed.

The request processing interface 88 can also be configured to allow users to approve pending request from other users. For example, a particular distribution can be private, in that only approved or invited content consumer users are allowed to subscribe. Accordingly, the request processing interface 88 can provide a web form for a content consumer user to request a subscription and provide a web form for the associated content producer user to approve or deny the subscription request. Similarly, privacy legislation in a content consumer user's country of residence can require explicit opt-in to email communications. Hence, the request processing interface 88 can provide a web form for a content producer user to request content delivery to a content consumer user and provide a web form for the content consumer user to approve or deny content delivery.

The content subscription manager 28 includes a subscription database 94 that stores subscription information, which can take the form of content distributions 96. Content distributions 96 can contain an association of content producer content to content consumer users, so that particular content can be delivered to the subscribing content consumer users. Content producer content can be indicated by a content producer user ID or by distribution ID. In the former case, content consumer users subscribe to all content form a particular content producer user. In the latter case, content producer users subscribe to particular content, such as a particular morning note. The latter can be preferable when a content producer user produces different types of content or operates in different sectors. The content distributions 96 can contain or be associated with delivery data indicative of whether content-bearing messages should be logged and tracked.

Figure 6:
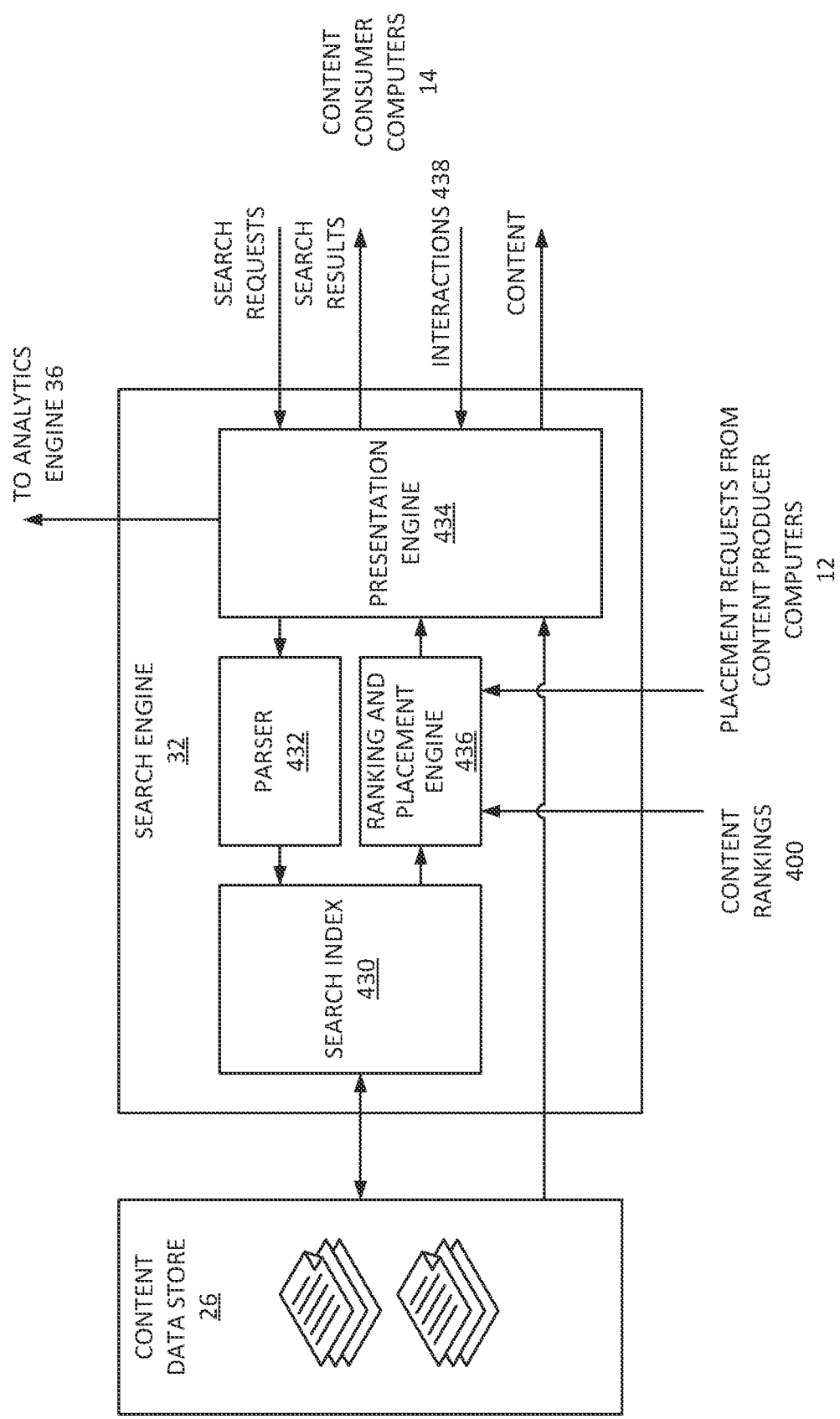
FIG. 6 is a block diagram of a search engine.

FIG. 6 illustrates the search engine 32. FIG. 6 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The search engine 32 includes a search index 430, a parser 432, a presentation engine 434, and a ranking and placement engine 436.

The search index 430 may include a database or similar that stores associations between items of content in the content data store 26 and keywords, categories, and/or other keys that can be used to search for content. The search engine 32 can be configured to periodically index the content data store 26 to update the search index 430.

The parser 432 is configured to parse search requests input at the presentation engine 434 by users of content consumer computers 14. Search requests may be strings of text and parsing search requests may include detecting and applying logical operators (e.g., AND, NOT, OR, etc.) to other words contained in the string. Parsing may also include determining and applying word roots and query constructing operations. The parser 432 may further be configured to detect an indication of a category or other metadata for the search request. Output of the parser 432 is one or more queries compatible with the database storing the search index 430.

The presentation engine 434 is configured to provide an input and output interface for the search engine 32. The presentation engine 434 can be implemented with markup (e.g., HTML/CSS), scripting (e.g., JavaScript, jQuery, etc), and similar technologies. The presentation engine 434 can output a webpage to users of content consumer computers 14 to receive input of search requests. The presentation engine 434 can further output webpages to display search results and display content corresponding to the search results. The presentation engine 434 can form part of the content consumer interface 22 (FIG. 1).

The presentation engine 434 can be configured to track interactions 438 with content distributed through the search engine 32. Selection of a search result for viewing and viewing time are examples of interactions that can be tracked using scripts or other techniques at the browser or other agent of the content consumer computer 14. For example, each search result can be listed as a hyperlink to the respective item of content. The presentation engine 434 can detect selection of the hyperlink as an interaction 438. The presentation engine 434 is configured to send indications of the interactions 438 to the analytics engine 36.

The ranking and placement engine 436 can be configured to rank the search results and to insert indications of particular items of content into the ranked search results. Ranking the search results can be based on the content rankings 400 determined from past interactions with the content, as discussed elsewhere herein. Various kinds of interactions can be weighted differently and, further, the identity of the interacting user can be taken into account. Moreover, ranking the search results can account for the characteristics of the search specific keywords, category (and other metadata), and characteristics of the user conducting the search, as also provided for by the content rankings 400. In some implementations, the ranking and placement engine 436 modifies raw search results from the search index 430 with content rankings 400 using a query or other operation.

The ranking and placement engine 436 can insert indications of particular items of content into the ranked search results as requested by users at the content producer computers 12. That is, paid placements can be inserted into the ranked search results. Such insertions do not follow the ranking logic, and the presentation engine 434 may indicate such by highlighting or otherwise delineating such insertions.

Figure 7:
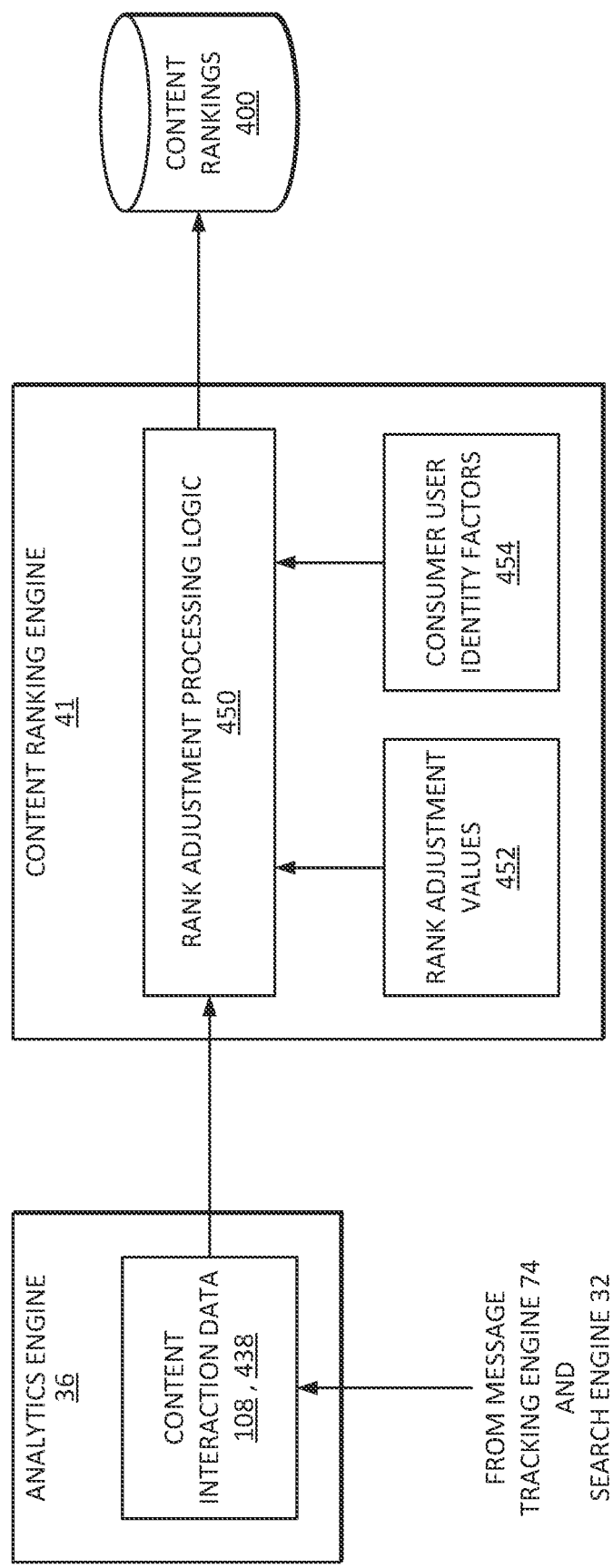
FIG. 7 is a block diagram of an analytics engine and a content ranking engine.

FIG. 7 illustrates the analytics engine 36 and the content ranking engine 41. FIG. 7 is schematic and illustrative, and functionality described for various blocks can be split into smaller blocks or combined into larger blocks. Connections between blocks are representative of information communication, with arrows illustrating the generally contemplated flow of information. Blocks, connections, and arrows are not to be taken as limiting.

The analytics engine 36 is configured to receive content interaction data 108 from the message tracking engine 74 and store content interaction data 108. The analytics engine 36 is also configured to receive content interaction data 438 from the search engine 32 and store content interaction data 438. Content interaction data 108 can be stored indefinitely to permit historical analysis. The content interaction data 108 can be received as time- or date-stamped from the message tracking engine 74.

Content interaction data 108 from the distribution engine 30 can be stored in association with subscriber/user ID and distribution ID. Content interaction data 438 from the search engine 32 can be stored in association with subscriber/user ID and the search query. Hence, any information about a user who interacted with content can be obtained.

The content ranking engine 41 includes rank adjustment processing logic 450, rank adjustment values 452, and consumer user identity factors 454. For each content interaction represented by interaction data 108, 438, the rank adjustment processing logic 450 selects a rank adjustment value 452 associated with such an interaction. As mentioned above, some interactions affect rank more than others. For instance, clicking a link in a distribution email may have a lower rank adjustment value than viewing the content of the distribution email for a certain period of time. The rank adjustment processing logic 450 can also be configured to select a consumer user identity factor 454 based on the subscriber/user ID of the consumer user who interacted with the content. That is, not all consumer users affect rank in the same way, and the consumer user identity factors 454 can be configured so that influential consumer users have a greater effect on content rank. Once a suitable rank adjustment value 452 and consumer user identity factor 454 have been selected, the rank adjustment processing logic 450 adjusts the content ranking 400 associated with the item of content.

The same item of content can have various rankings. The item of content may have one ranking for one keyword and another ranking for another keyword. The same applies for category, consumer user identity, and other metadata of the content item. For instance, the same item of content may be ranked highly for a certain target category and ranked lower for a tangentially related category. Hence, the rank adjustment processing logic 450 is configured to adjust the relevant ranking(s) for a particular item of content. To facilitate this, the rank adjustment processing logic 450 can reference the search query accompanying the content interaction data 438 received from the search engine 32, the subscriber/user ID of the content consumer user, and similar information and update the appropriate content rankings 400.

Figure 8A:
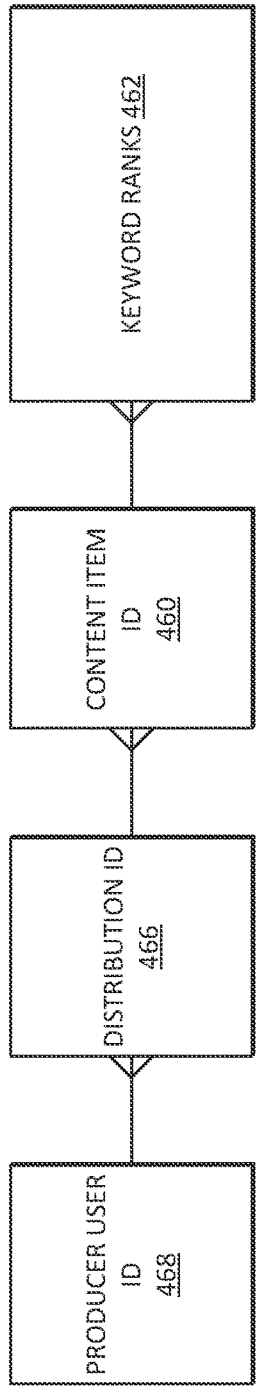
FIGS. 8a-c are schematic diagrams of example data structures for content ranking.
Figure 8B:
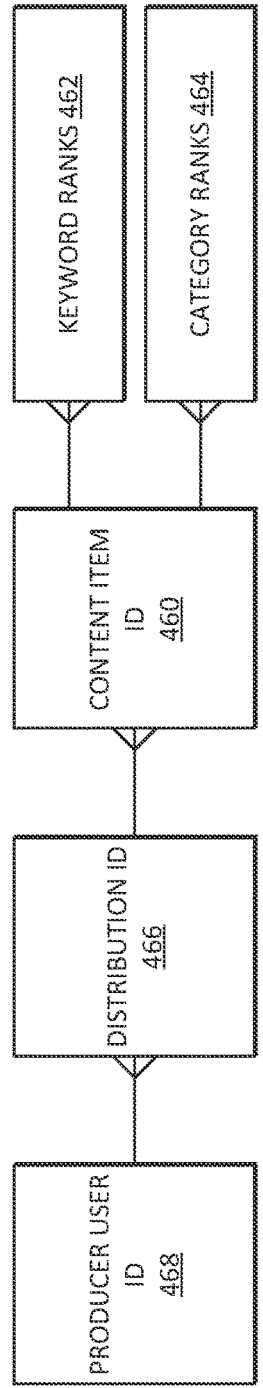
Figure 8C:
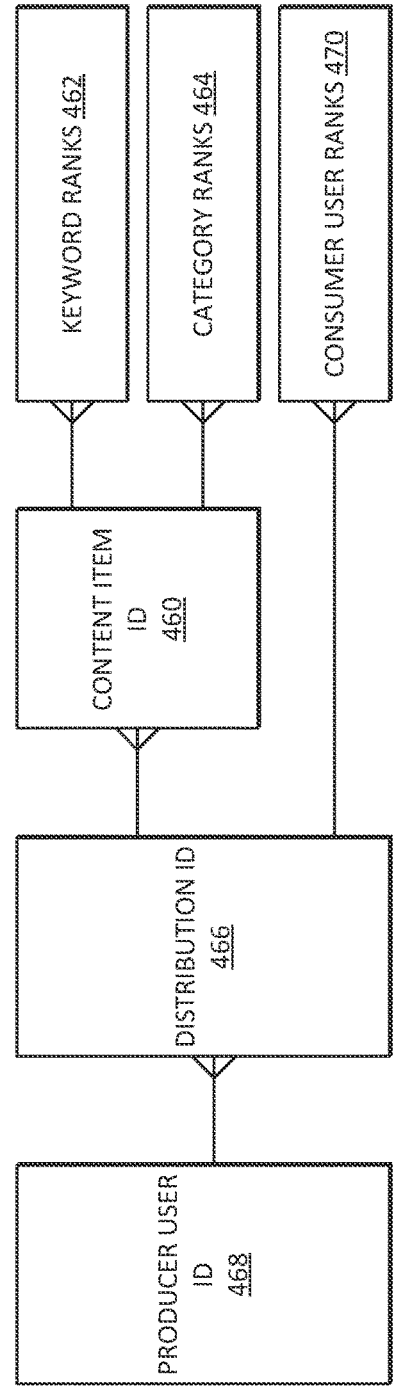

FIGS. 8*a-c* show example data structures for use with the present invention. The data structures shown are merely examples and are not intended to be limiting. The data structures shown are examples of data structures suitable for storing the content rankings 400, and illustrate that the same item of content can have various different rankings.

Content items can be identified by unique content item identifiers 460, which can be associated with keyword-specific ranks 462. Each item of content may have many different keyword ranks. An example of such a data sub-structure may be as shown in Table 1 below:

TABLE 1

| CONTENT ITEM ID | KEYWORD | KEYWORD RANK |
|---|---|---|
| 68125 | mining | 6.44 |
| 68125 | gold | 3.18 |
| 12648 | wireless sector | 8.98 |

Unique content item identifiers 460 may also be associated with category-specific ranks 464, as shown in Table 2 below:

TABLE 2

| CONTENT ITEM ID | CATEGORY | CATEGORY RANK |
|---|---|---|
| 68125 | Minerals and Mining | 1.98 |
| 68125 | Resources | 5.53 |
| 12648 | Telecommunications | 4.31 |

Again, a many-to-one relationship may be maintained between category-specific ranks 464 and content item identifier. Various implementations may use one or both of category-specific ranks 464 and keyword-specific ranks 462.

Similar to the above examples, unique content item identifiers 460 may also be associated with other information, such as consumer user role/type, and have specific ranks for such associations.

The data structures shown in FIGS. 8*a-c* can also associate unique content identifiers 460 with distribution identifiers 466, which can be associated with content producer user identifier 468. This can allow for various levels of rankings, such as associating consumer user ranks 470 with distributions, as shown in FIG. 8*c*. That is, when an interaction is detected, in addition or alternatively to updating the rank for the content item, the content ranking engine 41 updates a consumer user-specific rank 470 of the distribution to which the content item belongs. Consumer user-specific ranks 470 can be based on predefined user type or role, for example. Table 3 shows an example.

TABLE 3

| DISTRIBUTION ID | CONSUMER USER TYPE | CONSUMER-USER RANK |
|---|---|---|
| 983 | Junior Analyst | 7.00 |
| 772 | Junior Analyst | 9.11 |
| 772 | Executive | 4.37 |

The ranking and placement engine 426 of the search engine 32 can be configured to refer to any of the ranks 462, 464, 470, or combinations thereof, when ranking search results. This can be achieved in various ways. For example, one of the ranks 462, 464, 470 may be given precedence over the others. Thus, the preferred rank is used, when appropriate, while another rank is used if the preferred rank is not available. In another example, all available ranks 462, 464, 470 are combined mathematically, such as by way of a weighted average. In still another example, rank selection may be situational. That is, with reference to FIG. 8c, during a search keyword ranks 462 and category ranks 464 are averaged, whereas when a distribution is recommended to a consumer user, the consumer user rank 470 is used.

As discussed elsewhere herein, items of content may be authored by content producer users and then distributed to consumer users via distributions (e.g., mailing lists). Hence, a rank of a particular distribution, and further the rank of a particular author, can be calculated from ranks of individual items of content.

Figure 9:
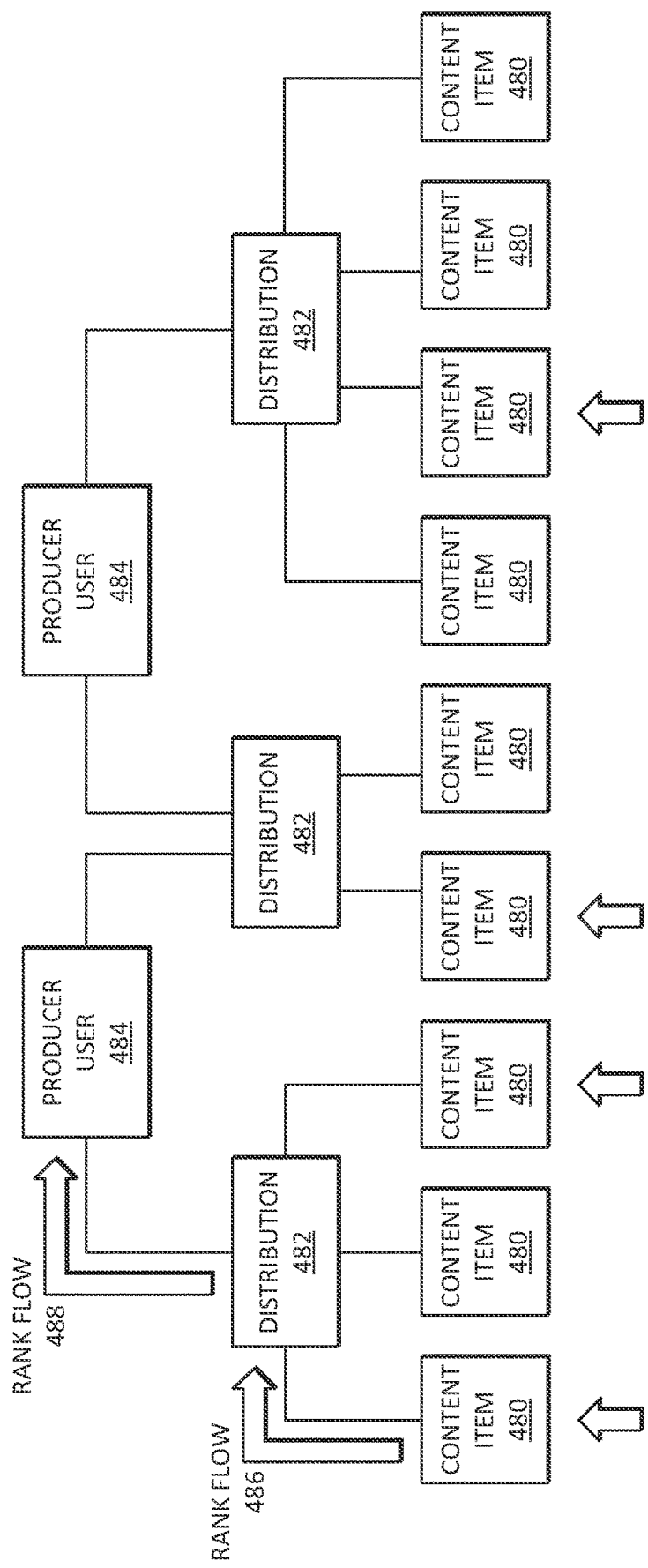
FIG. 9 is a schematic diagram of content rank flow.

FIG. 9 shows how content rank flows from individual items of content 480 to distributions 482 to which the content items belong, and further to content producing users 484 who author the content. Flow of rank, shown at 486, from content items to distributions 482 can be implemented mathematically by, for instance, taking a moving average of the ranks of the last predetermined number of content items 480 of a particular distribution. Flow of rank, shown at 488, from distributions 482 to content producing users 484 can be implemented mathematically by, for example, averaging the ranks of the distributions 484 to which a specific content producing user 484 contributes. Other mathematical operations in addition to or instead of moving average and average can be used in various embodiments.

Distribution ranks and author ranks can be used by the search engine 32 when recommending content. Distribution ranks and author ranks can be used by the system 10 for other purposes as well.

Figure 10:
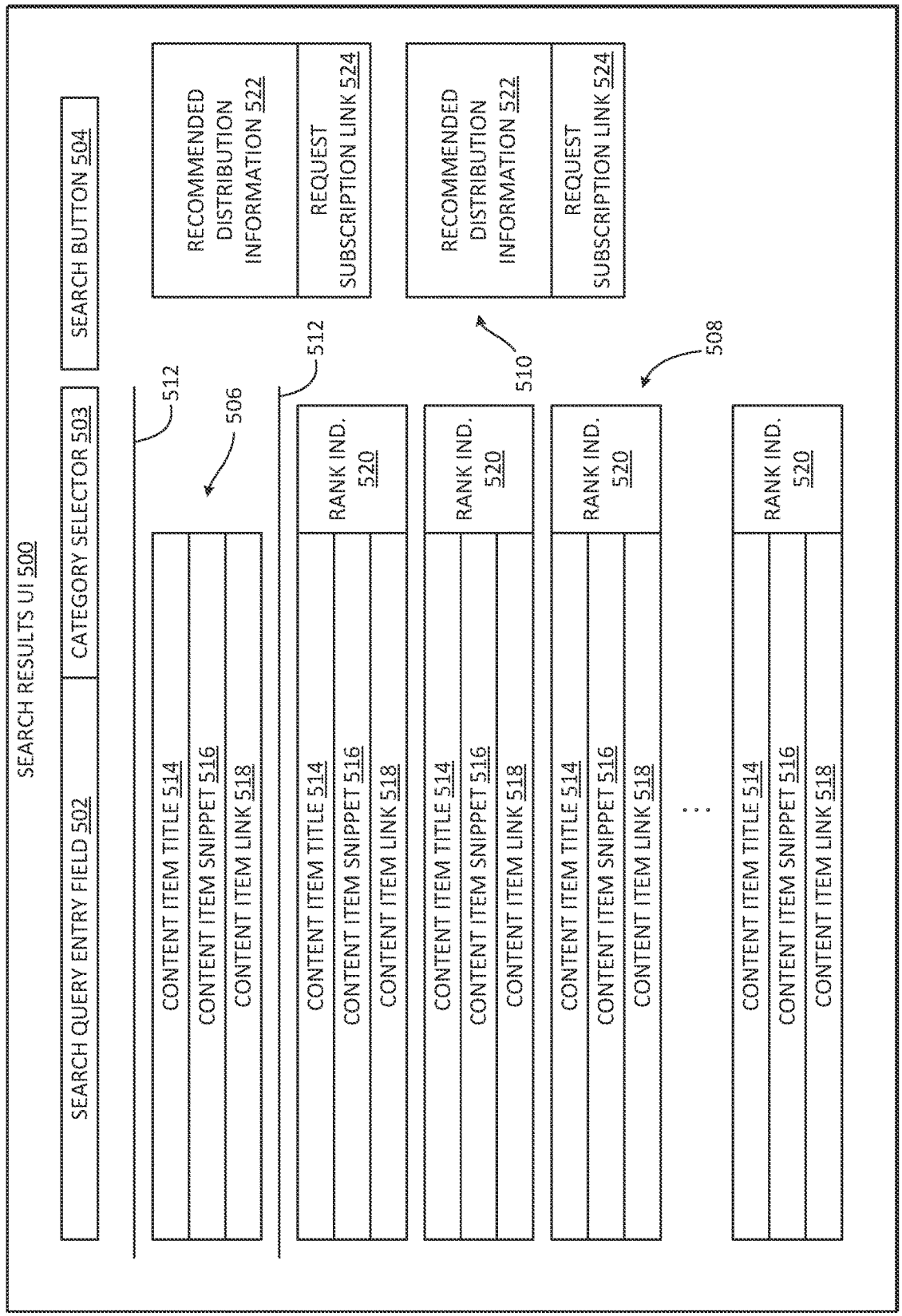
FIG. 10 is a schematic diagram of a user interface.

FIG. 10 shows an example of a user interface 500 implemented as part of the presentation engine 434 of the search engine 32. The interface 500 includes a search query entry field 502, a category selector 503, a search button 504, a placed content element 506, a plurality of ranked content elements 508, and a plurality of recommended distribution elements 510. The user interface 500 can be embodied as a script-generated webpage, of instance.

The search query field 502 is configured to receive input of a text string representative of a search query. The category selector 503 can be a dropdown list or other interface control configured to allow selection of one or more predetermined categories of content as part of the search query. The search button 504 is configured to submit the search query to parser 432 (FIG. 6) for execution. Prior to execution of a search, only the search query field 502 and search button 504 need be shown in the user interface 500.

Execution of the search returns the placed content element 506, the ranked content elements 508, and the recommended distribution elements 510.

The placed content element 506 can be visually offset from the ranked content elements 508 by lines 512 or other indicators, such as color, font, and similar. In this example, the placed content element 506 is shown positioned above the ranked content elements 508. However, any position can be suitable for the placed content element 506.

The placed content element 506 includes a content item title 514, a content item snippet 516, and a content item link 518. The content item title 514 displayed the title of the content item and the content item snippet 516 displays a small portion of the content item. The content item link 518 can be a hyperlink or other element that request the item of content from the data store 26 (FIG. 6).

The ranked content elements 508 are sorted by descending rank. Each of the ranked content elements 508 includes a content item title 514, a content item snippet 516, and a content item link 518. The ranked content elements 508 may also display rank indications 520. A rank indication 520 may be the actual determined rank of the content element 508 (e.g., 6.44), or may be a fuzzy approximation of the rank (e.g., "relevant" or "highly ranked"). However, it is contemplated that rank indications 520 are not shown. As with the placed content element 506, selection of the content item link 518 requests the item of content from the data store 26.

Recommended distribution elements 510 can be shown to recommend distributions for subscription by the user conducting the search. Information 522, such as title and author, of distributions having a suitable rank is shown. Each recommendation can include a hyperlink 524 that requests 86 (FIG. 5) a subscription from the manager or author of the distribution. The recommended distribution elements 510 can be determined by the ranking and placement engine 436 (FIG. 6) based on the rank of the distribution 482 and/or its authoring producer user(s) 484 (FIG. 9) in conjunction with, or instead of, any keywords or categories specified in the search query.

Figure 11:
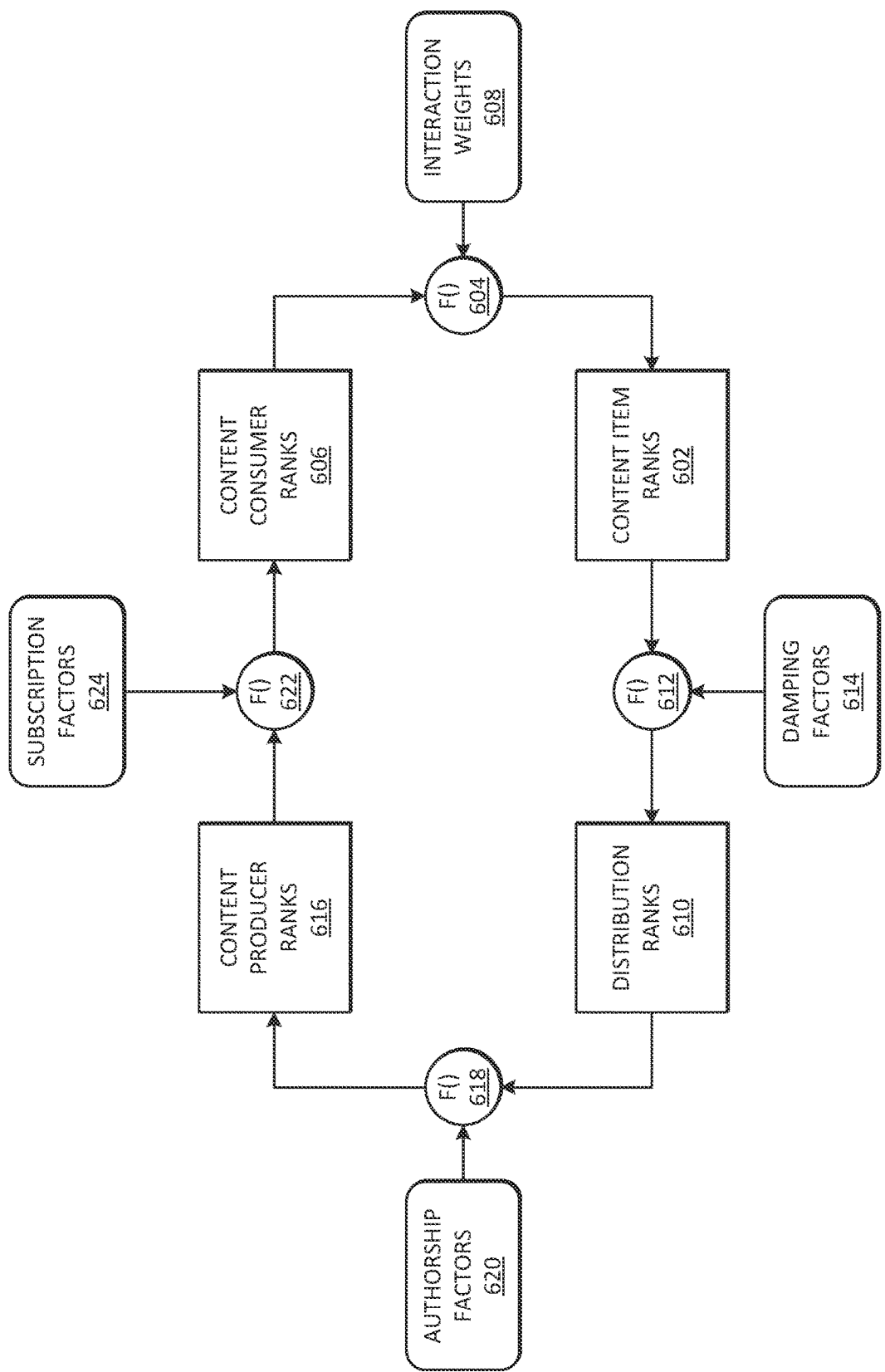
FIG. 11 is a schematic diagram of a ranking process.

FIG. 11 illustrates a process for determining ranks for content producers, content consumers, content items, and distributions. Rank flows from content consumers to content items, from content items to distributions, from distributions to content producers, and from content producers to content consumers. The process includes feedback and can be performed for a configured number of iterations or until values converge. The process can be performed using any of the systems described herein, and particularly can be implemented in the rank adjustment processing logic of FIG. 7.

Content item ranks 602 are determined as a function 604 of content consumer ranks 606 and interaction weights 608 of content consumer parties with content items. The function 604 can include mapping each content consumer's rank 606 to interacted content items and applying an interaction weight 608 that values different types of tracked interactions differently. Content item ranks 602 change as content consumers interact with items of content. For example, a content item's rank 602 can be the sum of each rank 606 of a content consumer who interacted with the content item multiplied by the interaction weight 608 assigned to the particular interaction. Example interaction weights 608 include a value of 1.0 for viewing a content item for more than a pre-set time, a value of 0.5 for opening a content item but viewing it less than the pre-set time, and a value of 0.0 for not opening the content item. Values can be assigned to other tracked interactions, such as forwarding a message containing the content item. Interaction weight can be calculated based on various tracked interactions, with FIG. 3 and the related description providing additional detail in terms of rank adjustment values. Interaction weight can be modified by consumer user identity factor for added effect due to influential users, as discussed above. A content item that is interacted with by more content consumers and with interactions showing greater engagement is ranked higher than a content item that is interacted with by fewer content consumers and with interactions showing lower engagement.

Distribution ranks 610 are determined as a function 612 of content items ranks 602 and one or more damping factors 614. The function 612 can include summing the products of the content item rank 602 and a damping factor 614 for each content item in a distribution to arrive at that distribution's rank 610. An example damping factor 614 is inversely proportional to an age of the content item, so that older content items affect the distribution rank 610 less. Another example damping factor 614 is a value of 1.0 for content items more recent than a pre-set or configurable age and a value of 0.0 for content items older than such age. New and highly ranked content items increase the distribution rank 610 more than older and lower ranked content items.

Content producer ranks 616 are determined as a function 618 of distribution ranks 610 and authorship factors 620. The function 618 can include summing the products of the distribution rank 610 and an authorship factor 620 for each distribution at least partially authored by a content producer to arrive at that content producer's rank 616. An example authorship factor 620 is a value of 1.0 divided by the number of authors of the distribution, so that distribution rank 610 is spread evenly among multiple authors. Authorship factors 620 can alternatively be configurable for each distribution, so that rank can be assigned proportionally to contribution or other concerns. Highly ranked distributions cause content producers to become highly ranked, while lower ranked distributions cause content producers to become ranked lower.

Content consumer ranks 606 are determined as a function 622 of content producer ranks 616 and subscription factors 624. The function 622 can include summing the products of the content producer rank 616 and subscription factor 624 for each content producer who has as a subscriber a content consumer, so as to arrive at a rank 606 for that content consumer. An example subscription factor 624 is a value of 1.0 for a subscribed distribution and otherwise a value of 0.0. Highly ranked content producers cause their subscriber content consumers to be more highly ranked, while content consumers who are ranked lower result in lower ranks for content consumers.

As can be seen from FIG. 11, content consumer ranks 606 influence content item ranks 602, which influence distribution ranks 610, which in turn influence content producer ranks 616, which feed back to influence content consumer ranks 606. The ranks 602, 606, 610, 616 can be calculated iteratively. That is, the old content consumer ranks 606 can be used to calculate new content items ranks 602, which can be used to calculate new distribution ranks 610. The new distribution ranks 610 can be used to calculate new content producer ranks 616, which can then be used to calculate new content consumer ranks 606. The difference between a new rank and a respective old rank can be evaluated, where a difference larger than a threshold triggers another cycle of rank calculation. One set of ranks, such as the content consumer ranks can be used to evaluate convergence and determine whether another cycle of rank calculation is needed. Ranks across multiple consumers, content items, distributions, or producers can be averaged or sampled to assist in determining convergence, in that sampled or average ranks can be compared between cycles. Several different sets of ranks (e.g., consumer and content item) can be used to evaluate convergence. Appropriate selection of the functions 604, 612, 618, 622 and factors 608, 614, 620, 624 can ensure convergence.

Figure 12:
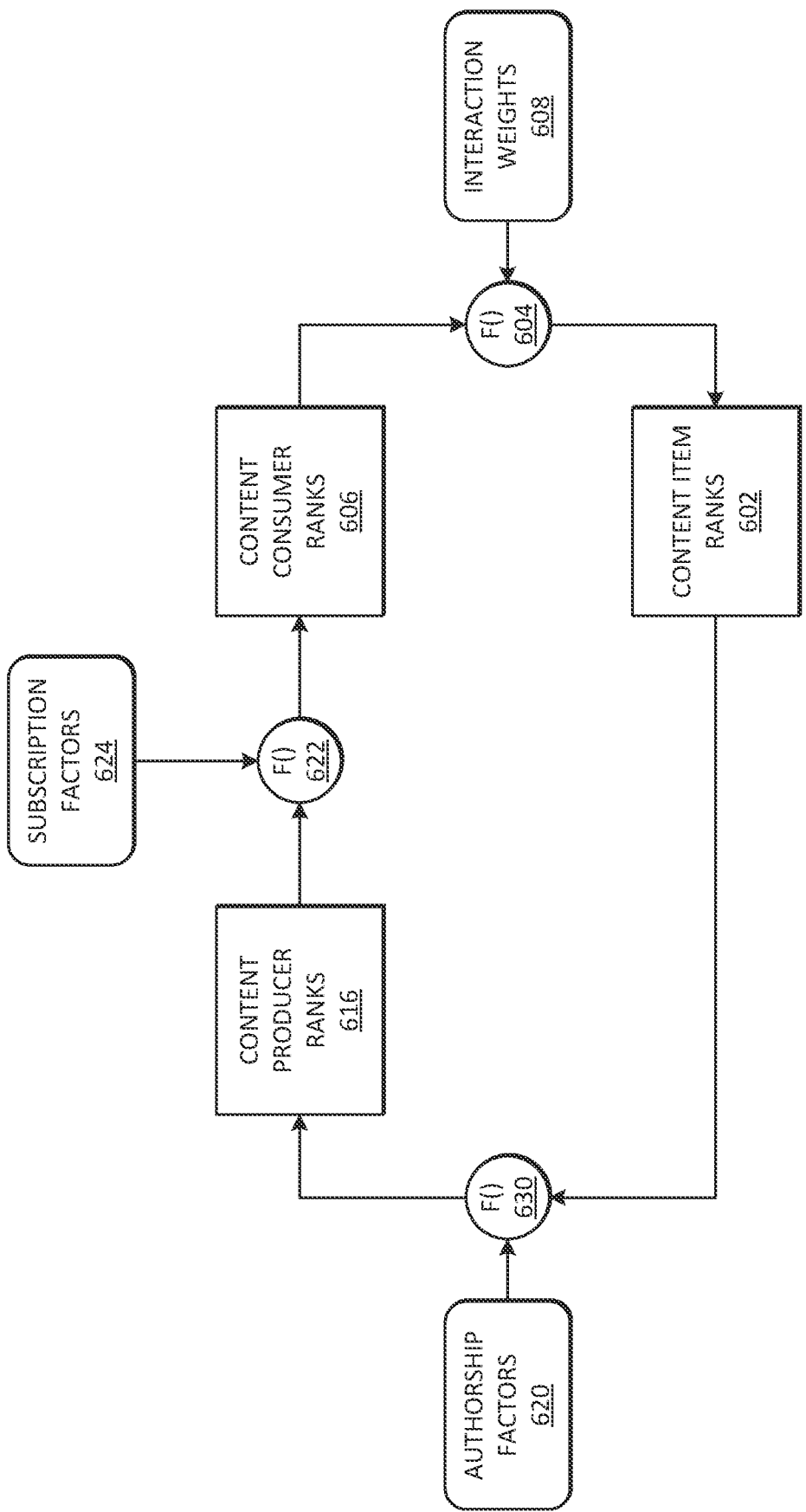
FIG. 12 is a schematic diagram of another ranking process.

FIG. 12 illustrates another process for determining ranks for content producers, content consumers, content items, and distributions. The process of FIG. 12 is similar to that of FIG. 11 and only differences will be discussed in detail. The above description can be referenced for like reference numerals. The process can be performed using any of the systems described herein, and particularly can be implemented in the rank adjustment processing logic of FIG. 7.

Content producer ranks 616 are determined as a function 630 of content item ranks 602 and authorship factors 620. The function 630 can include summing the products of the content item ranks 602 and an authorship factor 620 for each distribution at least partially authored by a content producer to arrive at that content producer's rank 616. Highly ranked content items cause content producers to become highly ranked, while lower ranked content items cause content producers to become ranked lower.

If distributions are ranked outside this process, for example by direct feedback from content consumers, then distribution ranks can be provided as another input to the function 630.

Figure 13:
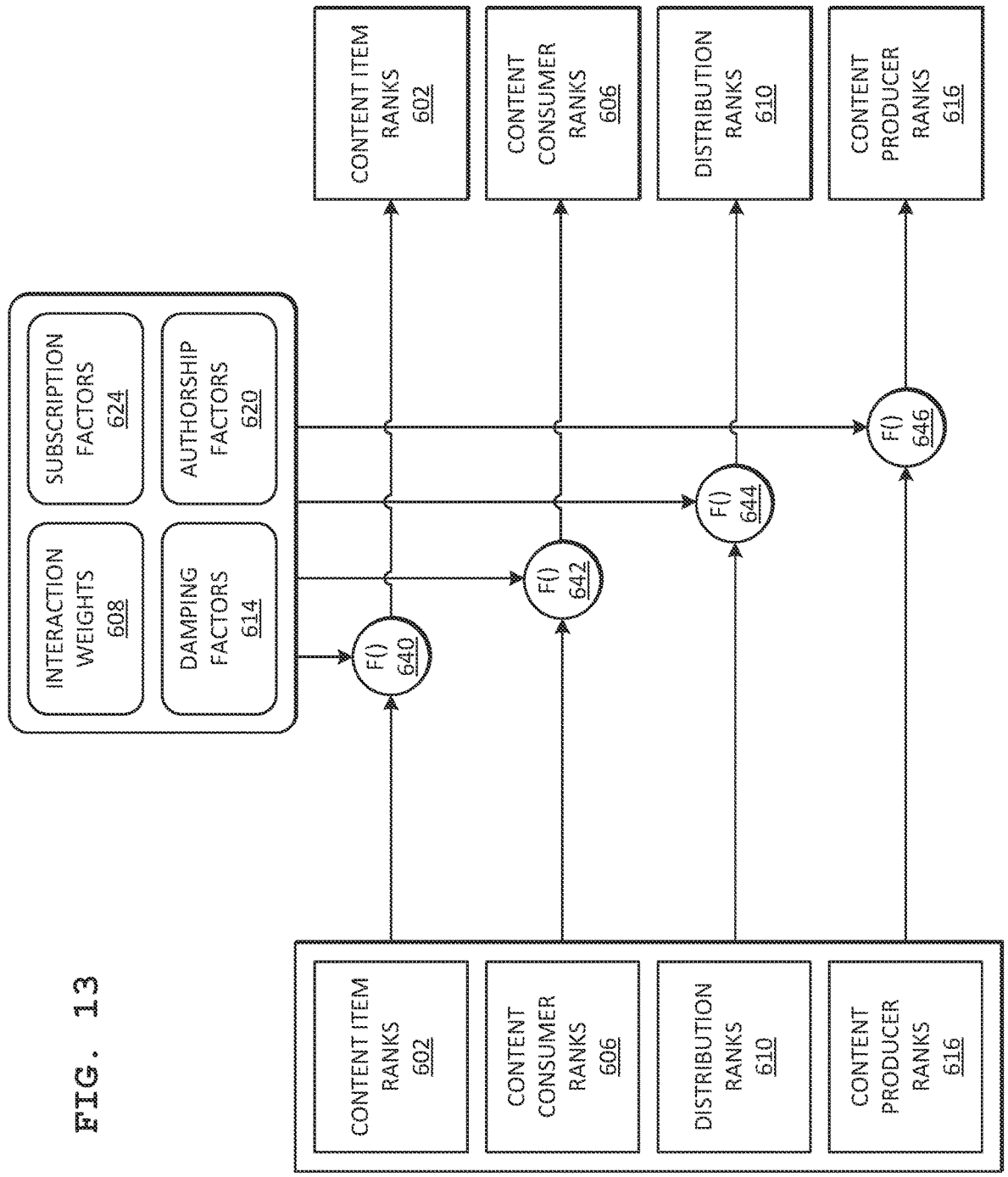
FIG. 13 is a schematic diagram of another ranking process.

Other process for determining ranks for content producers, content consumers, content items, and/or distributions are contemplated and the processes of FIGS. 11 and 12 are examples. A generalized process is shown in FIG. 13. In the process of FIG. 13, functions 640, 642, 644, 646 take all factors 608, 614, 620, 624 and all ranks 602, 606, 610, 616 as inputs when calculating new values for ranks 602, 606, 610, 616. Each function 640, 642, 644, 646 need not use all factors or ranks when calculating its respective new rank 602, 606, 610, 616. Each function 640, 642, 644, 646 can be configured to calculate its respective rank 602, 606, 610, 616 using any of the factors 608, 614, 620, 624 as inputs and further using any of the ranks 602, 606, 610, 616 as feedback or feedforward input.

In view of the above, it should be apparent that the techniques described herein offer numerous advantages to content producer parties, content consumer parties, and third parties involved in the creation, distribution, and consumption of financial information and data. Content consumer parties are provided with relevant content in a convenient manner. Discovery of new content is simplified. Moreover, a messaging pathway, where rich interaction data can be obtained, is used to improve content rankings for search and other content delivery pathways. Further advantages will also be apparent to those skilled in the art.

While the foregoing provides certain non-limiting example embodiments, it should be understood that combinations, subsets, and variations of the foregoing are contemplated. The monopoly sought is defined by the claims.

What is claimed is:

1. A content distribution system comprising:
one or more processors configured to:
control distribution of content items provided by content producer computers to content consumer computers via messages communicated over a computer network;
track indications of different interactions with content items contained in the messages, the different interactions with content items occurring at the content consumer computers;
index content items and output ranked indications of at least some indexed content items in response to search queries, and track indications of different interactions with indexed content items occurring at the content consumer computers; and
rank the content items based on the received indications of different interactions with content items occurring at the content consumer computers and further based on an influence factor specific to a content consumer at a respective content consumer computer, wherein a high influence factor increases the rank.

2. The system of claim 1, wherein the one or more processors are further configured to calculate ranks for the content items based on weightings or adjustment values for the different interactions with the content items.

3. The system of claim 2, wherein the one or more processors are further configured to calculate ranks for content producers at content producer computers based on ranks of associated distributions controlled by the one or more processors, and to calculate ranks for distributions controlled by the one or more processors based on ranks of content items contained in the distributions.

4. The system of claim 3, wherein the one or more processors are further configured to calculate ranks for content consumers at the content consumer computers based on ranks of content producers at the content producer computers, the content consumers and content producers being associated via the distributions.

5. The system of claim 4, wherein the one or more processors are further configured to calculate ranks for distributions controlled by the one or more processors based on ranks of content items contained in the distributions and damping factors based on ages of content items.

6. The system of claim 1, wherein the one or more processors are further configured to assign a plurality of ranks to content items for a plurality of different keywords and a plurality of different categories.

7. A method of content distribution with ranking, the method comprising:
controlling distribution of content items provided by content producer computers to content consumer computers via a computer network;
tracking indications of different interactions with content items contained in messages distributed to content consumer computers, the different interactions with content items occurring at the content consumer computers;
indexing content items and outputting ranked indications of at least some indexed content items in response to search queries, and tracking indications of different interactions with indexed content items occurring at the content consumer computers; and
receiving indications of different interactions with content items contained in messages distributed to content consumer computers and with indexed content items outputted in response to search queries, and ranking the content items based on the received indications of different interactions and further based on an influence factor specific to a content consumer at a respective content consumer computer, wherein a high influence factor increases the rank.

8. The method of claim 7, further comprising calculating ranks for the content items based on weightings or adjustment values for the different interactions with the content items.

9. The method of claim 8, further comprising calculating ranks for content producers at content producer computers based on ranks of associated distributions controlled by a content subscription manager, and calculating ranks for distributions controlled by the content subscription manager based on ranks of content items contained in the distributions.

10. The method of claim 9, further comprising calculating ranks for content consumers at the content consumer computers based on ranks of content producers at the content producer computers, the content consumers and content producers being associated via the distributions.

11. The method of claim 10, further comprising calculating ranks for distributions controlled by the content subscription manager based on ranks of content items contained in the distributions and damping factors based on ages of content items.

12. The method of claim 7, further comprising assigning a plurality of ranks to content items for a plurality of different keywords and a plurality of different categories.

* * * * *